US011297505B2

(12) United States Patent
San Miguel et al.

(10) Patent No.: US 11,297,505 B2
(45) Date of Patent: Apr. 5, 2022

(54) SYSTEM AND METHOD FOR AGGREGATED MACHINE LEARNING ON INDICATORS OF COMPROMISE ON MOBILE DEVICES

(71) Applicant: The United States of America as Represented by the Secretary of the Navy, San Diego, CA (US)

(72) Inventors: John Michael San Miguel, Winchester, CA (US); Megan Elane Monteverde Kline, Chula Vista, CA (US); Roger Alexander Hallman, West Lebanon, NH (US); Jose Virgilio Romero-Mariona, San Diego, CA (US); Johnny Phan, San Diego, CA (US); Christopher Michael Weeden, San Diego, CA (US); Scott Michael Slayback, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 400 days.

(21) Appl. No.: 16/596,575

(22) Filed: Oct. 8, 2019

(65) Prior Publication Data

US 2021/0105613 A1 Apr. 8, 2021

(51) Int. Cl.
*H04L 29/06* (2006.01)
*H04W 12/37* (2021.01)
(Continued)

(52) U.S. Cl.
CPC .......... *H04W 12/37* (2021.01); *G06F 1/3209* (2013.01); *G06F 9/4406* (2013.01);
(Continued)

(58) Field of Classification Search
CPC ... H04W 12/37; H04W 12/63; H04W 12/122; G06N 20/00; G06F 16/1734;
(Continued)

(56) References Cited

U.S. PATENT DOCUMENTS 8,050,715 B1 * 11/2011 Cole ...................... H04B 1/034
455/557
8,631,488 B2 * 1/2014 Oz ........................ H04W 12/062
726/22
(Continued)

OTHER PUBLICATIONS

San Miguel et. al., "Aggregated Machine Learning on Indicators of Compromise in Android Devices" In Proceedings of the 2018 ACM SIGSAC Conference on Computer and Communications Security (CCS '18). ACM, New York, NY, USA, 2279-2281. DOI: https://doi.org/10.1145/3243734.3278494 Oct. 2018.
(Continued)

*Primary Examiner* — Hosuk Song
(74) *Attorney, Agent, or Firm* — Naval Information Warfare Center, Pacific; Kyle Eppele; James R. McGee

(57) ABSTRACT

A system identifies whether a mobile device is compromised. The system includes mobile devices, a communication network, and a server. Each mobile device includes a processor, a power supply, and a network interface. The processor executes an operating system and applications including a monitor application. The power supply indicates the power consumed by the mobile device during executing the operating system and the applications. The network interface transfers information to and from the mobile device via a communication network. This transferred information includes logs securely collected by the monitor application. The logs can include a log of the system calls, a log of the power consumed, and a log of network activity. The server receives the logs from the mobile devices and generates a correlation among the logs, and the server
(Continued)

identifies at least one mobile device that is an outlier in the correlation as a compromised mobile device.

20 Claims, 3 Drawing Sheets

(51) Int. Cl.

| | | |
|---|---|---|
| *G06F 16/17* | (2019.01) | |
| *G06F 9/4401* | (2018.01) | |
| *G06K 9/62* | (2022.01) | |
| *G06N 20/00* | (2019.01) | |
| *G06F 1/3209* | (2019.01) | |
| *H04W 12/63* | (2021.01) | |
| *H04W 12/122* | (2021.01) | |

(52) U.S. Cl.
CPC ....... *G06F 16/1734* (2019.01); *G06K 9/6257* (2013.01); *G06K 9/6277* (2013.01); *G06N 20/00* (2019.01); *H04W 12/122* (2021.01); *H04W 12/63* (2021.01)

(58) Field of Classification Search
CPC ... G06F 1/3209; G06F 9/4406; G06K 9/6257; G06K 9/6277
See application file for complete search history.

(56) References Cited

U.S. PATENT DOCUMENTS

| | | | | |
|---|---|---|---|---|
| 9,106,683 | B2* | 8/2015 | Oz | H04W 12/062 |
| 9,137,262 | B2* | 9/2015 | Qureshi | H04L 9/0822 |
| 9,143,530 | B2* | 9/2015 | Qureshi | H04L 63/0428 |
| 9,779,253 | B2* | 10/2017 | Mahaffey | H04L 69/14 |
| 9,930,257 | B2* | 3/2018 | Blum | H02J 7/025 |
| 10,063,595 | B1* | 8/2018 | Qureshi | G06F 21/6218 |

OTHER PUBLICATIONS

San Miguel et. al., "Aggregated Machine Learning on Indicators of Compromise" Technical Report 3390, NIWC Pacific San Diego United States, https://apps.dtic.mil/dtic/tr/fulltext/u2/1077818.pdf Jul. 1, 2019.

Yang, F. et. al., "Android Malware Detection Using Hybrid Analysis and Machine Learning Technique" In International Conference on Cloud Computing and Security (pp. 565-575). Springer, Cham. Nov. 2017.

Onwuzurike, L. et. al., "A Family of Droids: Analyzing Behavioral Model based Android Malware Detection via Static and Dynamic Analysis", arXiv preprint arXiv:1803.03448. Mar. 2018.

Kernel space. Available at http://www.linfo.org/kernel_space.html (Feb. 2005 retrieved Oct. 7, 2019).

Bower, T., 1.11. system calls—operating systems study guide. Available at http://faculty.salina.k-state.edu/tim/ossg/Introduction/sys_calls.html (2015 retrieved Oct. 7, 2019).

Burguera, L. et. al., "Crowdroid: behavior-based malware detection system for android" In Proceedings of the 1st ACM workshop on Security and privacy in smartphones and mobile devices, pp. 15-26. ACM. Oct. 2011.

Canfora, G. et. al., "Detecting android malware using sequences of system calls" In Proceedings of the 3rd International Workshop on Software Development Lifecycle for Mobile, pp. 13-20. ACM. Aug. 2015.

Caviglione, L. et. al., "Seeing the unseen: revealing mobile malware hidden communications via energy consumption and articial intelligence" IEEE Transactions on Information Forensics and Security, 11(4):799-810. 2016.

Dasgupta, D. et. al., "Multi-user permission strategy to access sensitive information" Information Sciences, 423:24-49. Sep. 2017.

Gajar, P. K. et. al., "Bring your own device (byod): Security risks and mitigating strategies" International Journal of Global Research in Computer Science (UGC Approved Journal), 4(4):62-70. Apr. 2013.

Giotopoulos, K. et. al., "Adoption of bring your own device (byod) policy in marketing" In 5th International Conference on Contemporary Marketing Issues ICCMI p. 342-344. Jun. 2017.

Hallman, R. A. and Kline, M., "Risk metrics for android (trademark) devices" Technical report 3061, Space and Naval Warfare Systems Center Pacific San Diego United States. Feb. 2017.

Lock, H.-Y. et. al., Using IOC (indicators of compromise) in malware forensics. SANS Institute InfoSec Reading Room. Feb. 2013.

Perkins, J. et, al., "Droidsafe" Technical report, Massachusetts Institute of Technology Cambridge United States. Dec. 2016.

Portela, F. et. al., "Benefits of bring your own device in healthcare" In Next-Generation Mobile and Pervasive Healthcare Solutions, pp. 32-45. IGI Global. 2018.

Shabtai, A. et. al., Mobile malware detection through analysis of deviations in application network behavior. Computers & Security, 43:1-18. 2014.

Shaji, R. S. et. al., A methodological review on attack and defense strategies in cyber warfare. Wireless Networks, pp. 1-12. 2018.

Song, Y. et. al., Affordances and constraints of byod (bring your own device) for learning and teaching in higher education: Teachers' perspectives. The Internet and Higher Education, 32:39-46. Aug. 2016.

Souppaya, M. et. al., Users guide to telework and bring your own device (byod) security. NIST Special Publication, 800:114. Mar. 2016.

Android debug bridge (adb). Available at https://developer.android.com/studio/command-line/adb.html (retrieved Oct. 17, 2019).

Ui/application exerciser monkey. Available at https://developer.android.com/studio/test/monkey.html (retrieved Oct. 17, 2019).

Vallee-Rai, R. et. al., Jimple: Simplifying java bytecode for analyses and transformations. 1998.

The pros and cons of 'bring your own device'. Available at https://www.forbes.com/sites/ciocentral/2011/11/16/the-pros-and-cons-of-bring-your-own-device/ (Nov. 2011, retrieved Oct. 7, 2019).

Yan, L.-K. et. al., "Droidscope: Seamlessly reconstructing the os and dalvik semantic views for dynamic android malware analysis" In USENIX security symposium, pp. 569-584. 2012.

\* cited by examiner

SYSTEM AND METHOD FOR AGGREGATED MACHINE LEARNING ON INDICATORS OF COMPROMISE ON MOBILE DEVICES

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 108745.

BACKGROUND OF THE INVENTION

Mobile technology has become ubiquitous in society, leading to new trends in many different sectors. "Bring Your Own Device" (BYOD) is a trend that has entered many workplaces to accommodate employees' comfort and familiarity with their personal devices. The benefits of BYOD policies include allowing companies to save money by not having to make information technology purchases and enabling a distributed computing and communications network of employees' equipment. Estimates in 2011 suggested that nearly 75% of employers allowed employees to connect their personal devices to enterprise networks, and this trend has only increased since then. Indeed, the BYOD phenomena can be found in diverse sectors such as business, education, and healthcare. Faced with a younger generation of workers who have always had mobile devices, government bodies at various levels within the United States are exploring the adoption of BYOD policies. This phenomenon is especially an issue for military organizations, where personal devices may interact with critical cyber-physical systems as well as environments that contain extremely sensitive information.

In light of this new reality, companies and especially military and other government organizations must determine ways to keep malicious applications on personal devices from infecting their networks.

SUMMARY

A system identifies whether a mobile device is compromised. The system includes mobile devices, a communication network, and a server. Each mobile device includes a processor, a power supply, and a network interface. The processor executes an operating system and applications including a monitor application for monitoring certain of the applications. The operating system has an application interface providing system calls for the applications to invoke services of the operating system. The power supply indicates the power consumed by the mobile device during execution of the operating system and the applications. The network interface transfers information to and from the mobile device via a communication network. This transferred information includes logs securely collected by the monitor application. The logs can include a log of the system calls invoked by each application, a log of the indicated power consumed by the mobile device during executing each application, and a log of network activity through the network interface for each application. The server receives the logs from each mobile device via the communication network. The server generates a correlation among the logs from the mobile devices, and identifies at least one mobile device that is an outlier in the correlation as a compromised mobile device.

A mobile device includes a processor, a power supply, and a network interface. The processor executes an operating system and applications including a monitor application for monitoring certain of the applications. The operating system has an application interface providing system calls for the applications to invoke services of the operating system. The power supply indicates the power consumed by the mobile device during execution of the operating system and the applications. The network interface transfers information via a communications network, including sending to a server logs securely collected by the monitor application. The logs can include a log of the system calls invoked by each application, a log of the indicated power consumed by the mobile device during executing each application, and a log of network activity through the network interface for each application. The monitor application receives from the server, via the network interface and via the communication network, a notice that the mobile device is compromised upon the server generating a correlation from the logs and the server identifying that the mobile device is an outlier in the correlation.

A method identifies whether a mobile device is compromised within a set of mobile devices each including a processor, a power supply, and a network interface. The processor of each mobile device executes an operating system and applications including a monitor application for monitoring certain of the applications. The operating system has an application interface providing system calls for the applications to invoke services of the operating system. The monitor application securely collects logs, which can include a log of the system calls invoked by each application, a log of the power provided by the power supply and consumed by the mobile device during executing each application, and a log of network activity through the network interface for each application. Information is transferred to and from the network interface of each mobile device via a communications network. This includes a server receiving the logs from each mobile device. The server generates a correlation among the logs of the mobile devices. The server identifies at least one mobile device that is an outlier in the correlation as a compromised mobile device.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
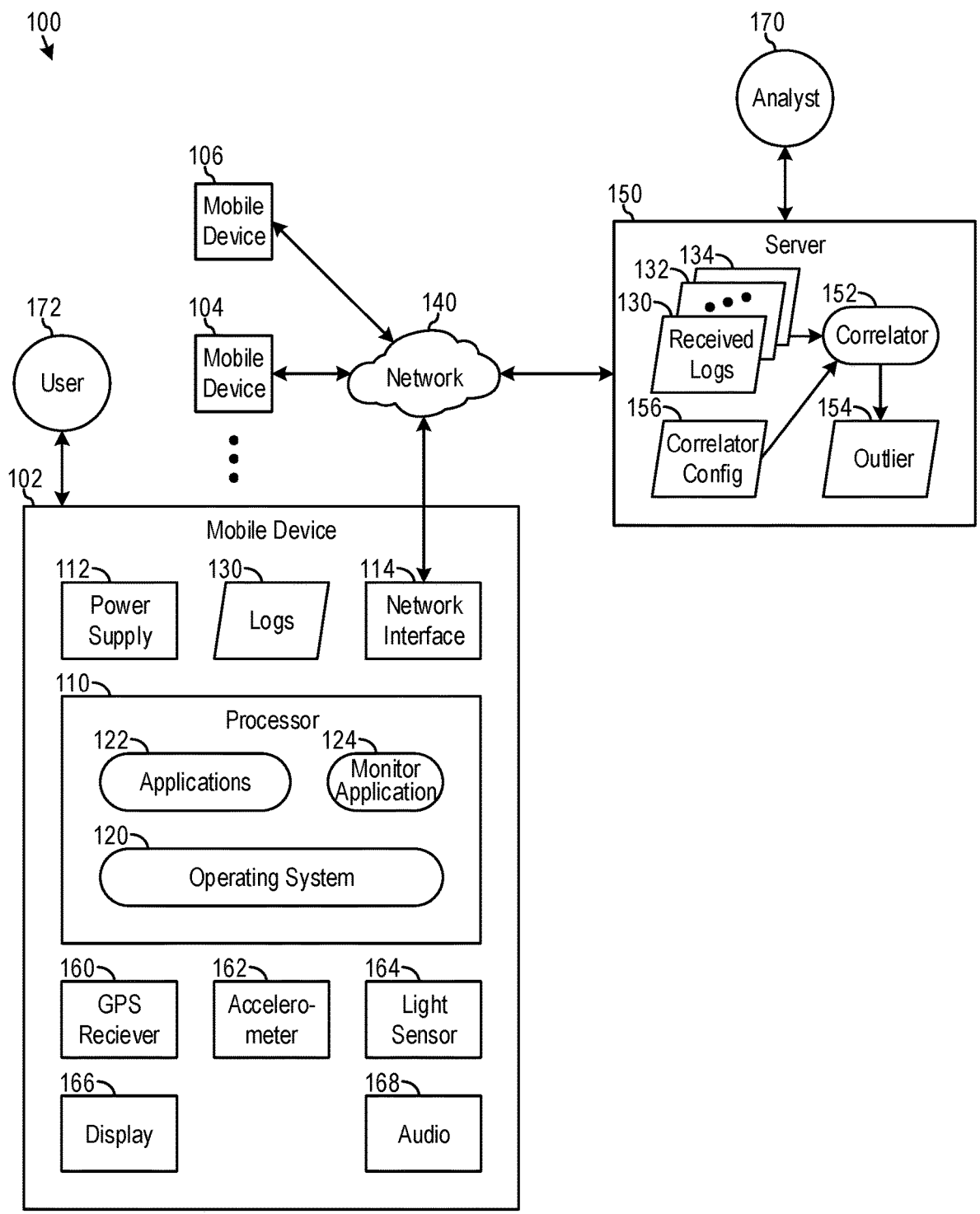
FIG. 1 is a block diagram of an embodiment of a system for identifying compromise of a mobile device.

The disclosed systems and methods below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

The increasing ubiquity of mobile computing technology has led to new trends in many different sectors. "Bring Your Own Device" (BYOD) is one such growing trend in the workplace, because it allows enterprise organizations to benefit from the power of distributed computing and communications equipment that their employees have already purchased. Unfortunately, the integration of a diverse set of mobile devices (e.g., smart phones, tablets, etc.) presents enterprise systems with new challenges, including new attack vectors for malware. Malware mitigation for mobile technology is a long-standing problem for which there is not yet a good solution.

Disclosed embodiments focus on identifying malicious applications and verifying the absence of malicious code in applications that the enterprises and their users seek to utilize. The analysis toolbox supplements static analysis, which is a pre-installation vetting technique designed to insure that malware is never installed in devices on an enterprise network.

Static (or code) analysis provides an analysis of an application without actually executing it. One such analysis technique is to create "feature vectors" that characterize a given application's characteristic actions (e.g., permissions requests). Benign applications within each category that have similar functions are expected to have similar permissions requests, while malicious ones deviate. The extent of deviation is measured and used for risk assessment. Most static analysis for risk assessment uses permission calls as the main criteria.

However, static analysis is vulnerable to code obfuscation. In addition, automatic application updates, dynamic code-loading techniques, and changing security requirements mean that applications that previously passed the static verification process, and have been installed on devices, may no longer meet security standards, and may be malicious.

Dynamic (or behavioral) analysis is not vulnerable to code obfuscation or other evasion techniques that can get past a static analysis regimen because dynamic analysis is able to observe malicious behavior on the execution path. Disclosed embodiments use dynamic analysis to identify malicious applications, and prevent future installation of them, with a crowd-sourced behavioral analysis technique that uses machine learning to identify malicious activity preferably through anomalies in system calls, network behavior, and power consumption.

An Indicator of Compromise (IOC) is a measurable event that may indicate the presence of a compromise. A single IOC does not provide sufficient confidence to determine whether malware is present on a mobile device. For example, a malicious application that continuously transmits recordings from the device camera and microphone will have a significant impact on device power consumption, but so will playing a game with high-resolution graphics. Disclosed embodiments collect data for two or more different IOCs, such as power consumption, network behavior, and sequences of system calls. The complete feature set is analyzed using machine learning techniques to detect anomalies and classify them as benign or malicious. This holistic approach to detecting malicious or unintended behaviors within applications provides greater accuracy over models that rely on a single IOC. Disclosed approaches also determine the best machine learning methodology for detecting malicious behavior in applications using multiple IOCs.

An example implementation measures IOCs for mobile devices executing the Android operating system. It will be appreciated that the disclosed embodiments are not limited to the Android operating system, and may include mobile devices with a mixture of different operating systems.

The power consumption of an application presents an IOC for analysis. Power consumption cannot be measured using static methods and must be monitored while the application is running on a device. Power consumption varies depending on the state and activities of the applications on a device. Collecting information on power consumption permits constructing baselines for expected power consumption of a device based on which applications are running at a given time. Discrepancies serve as an IOC that should be investigated for possible malice.

The example implementation leverages the on-device PowerTutor application (ziyang.eecs.umich.edu in directory projects/powertutor) to measure the power consumption of Android applications. The official PowerTutor repository was last updated in April 2013, but has been forked and modified to execute on current versions of Google's Android application programming interface (API). Functionality also has been added that enables sending collected data to an off-device server. PowerTutor measures power consumption from a running application as well as power consumption for each hardware component used by that application. PowerTutor measures the power usage of the following hardware components: CPU, OLED/LCD display, WIFI ethernet interface, cellular network interface, GPS, and audio. Attributing changes in these hardware component values to individual applications helps understand the power usage patterns of the applications.

Network activity is an IOC that should be considered when identifying malicious behavior of mobile applications. Capturing network activity is important for correlating network behaviors and patterns within mobile applications to characterize baseline behavior. Static analysis of an application may not detect maliciousness in the network patterns, but dynamic analysis identifies malicious activity from deviations in network behavior. The need for dynamic analysis of network behavior stems from weaknesses in static analysis to address applications that introduce malicious code at runtime or when updates are installed.

Mobile devices are nearly always communicating via network connections, whether on cellular or WIFI ethernet networks. Many legitimate applications on a mobile device are constantly polling the network to see if any new application information is available. The example implementation collects data on the state of all network communications. For each application, it is important to know the amount of data being sent, the frequency of send/receive communications, and an indication of whether the application is running in the foreground or the background. The example implementation leverages the Wireshark plugin Androiddump4 (wireshark.org) to collect and aggregate both cellular and WIFI ethernet networks activity, then sends the data off-device to the server for analysis.

The sequence in which system calls are made has also shown to be an important IOC for detecting malware. System calls are how an application accesses operating system services. These are underlying actions that user-level processes cannot be trusted to perform on their own, but which need to be performed in order to provide full application functionality. System calls allow these actions to be delegated to the trusted authority of the operating system kernel. System calls can be organized into multiple categories including: process control, file management, device management, information management, and communication.

Sequences of system calls can be used to identify common application behaviors and distinguish between benign activities and potentially malicious ones. Prior to installation, the only way to know how an application will communicate with the system is static analysis of its binary code against its permissions, as listed in the manifest file of the application's Android PacKage (APK). This manifest file may be incomplete, due to techniques such as code obfuscation and custom permissions designed to deceive static analysis methods. Anomalies in system call sequences serve as an IOC that may identify malware that is executed at random times and would not otherwise be easy to distinguish during normal operation.

The example implementation leverages the Android Debug Bridge (ADB), provided by the Android framework. Using the Strace function of ADB, the example implementation collects the system calls each application requests during execution to capture how the application uses the more than 250 system calls that are provided by the Android operating system. To generate a sufficient volume of data for analysis, the example implementation employs a tool called Monkey (developer.android.com at studio/test/monkey.html) to generate pseudo-random user activity within an application. The collected inputs and system call sequences are sent to the off-device server for further analysis. Over time, sequences of identical or similar user inputs (e.g., Monkey-generated clicks, touches, gestures . . . ) are expected to produce identical or closely related system call patterns in a benign application, but different system call patterns in a malicious application.

FIG. 1 is a block diagram of an embodiment of a system 100 for identifying compromise of a mobile device. The system 100 includes mobile devices 102 through 104 and 106. Like mobile device 102, each mobile device includes a processor 110, a power supply 112, and a network interface 114.

The processor 110 is adapted to execute an operating system 120 and applications 122 and 124 including a monitor application 124 for monitoring some or all of the applications 122. The operating system 120 has an application interface providing system calls for the applications 122 and 124 to invoke services of the operating system 120.

The power supply 112 provides power consumed by the mobile device 102 during execution of the operating system 120 and the applications 122 and 124 on processor 110. The power supply 112 indicates the power consumed.

The network interface 114 transfers information to and from the mobile device 102. This information includes logs 130 securely collected by the monitor application 124 executing on the processor 110. The logs 130 include at least two of the following: a log of the system calls invoked by each of the applications 122, a log of the indicated power consumed by the mobile device 102 during executing each of the applications 122, and a log of network activity through the network interface 114 for each of the applications 122. In one embodiment the logs 130 can include all of these logs and optionally additional logs, such as a log of position from a global positioning receiver 160 included in the mobile device 102, a log of movement from an accelerometer 162 included in the mobile device 102, and a log of illumination from a light sensor 164 included in the mobile device 102.

In one embodiment, the logs 130 include a log of a system call invoked by each of the applications 122 to request permission to use restricted services of the operating system 120. In one embodiment, the logs 130 include the indicated power consumed by each of the processor 110, a wireless ethernet interface and a cellular interface of the network interface 114, a display 166, an audio driver 168 such as speakers, and a global positioning receiver 160 during the execution of each of the applications 122. In one embodiment, the logs 130 include, for each of a wireless ethernet interface and a cellular interface of the network interface 114, a quantity of data transferred by each of the applications 122, the frequency of network activity by each of the applications 122, and an indicator that each of the applications 122 is executing in a foreground or a background.

A server 150 receives the logs 130 from the network interface 114 of mobile device 102 via the communication network 140. The server 150 also receives similar logs 132 and 134 from mobile devices 104 and 106 via the communication network 140. In general, communication network 140 transfers the information between server 150 and the network interface 114 of each of the mobile devices 102 through 104 and 106.

The server 150 is adapted to execute a correlator 152 that generates a correlation among the logs 130 through 132 and 134 of the mobile devices 102 through 104 and 106. At least one of the mobile devices 102 through 104 and 106 is identified as a compromised mobile device when it is an outlier 154 in the correlation. In one embodiment, the outlier 154 in the correlation further identifies at least one of the applications 122 of the compromised mobile device as a compromised application on the compromised mobile device. As discussed below, correlator 152 can be trained to generate the correlation with this training producing correlator configuration 156.

In a preferred embodiment, the server 150 is adapted to alert an analyst 170 that the compromised mobile device is compromised, for example, server 150 alerts analyst 170 that mobile device 102 is compromised. The analyst 170 can be a human or machine analyst. In response to the analyst 170 verifying that compromised mobile device 102 is compromised, the server 150 is adapted to send a notice via the communication network 140 to the monitor application 124 executing on the processor 110 of the compromised mobile device 102. In response to the notice, the monitor application 124 adapts the processor 110 to disable the compromised mobile device 102, for example, by interrupting the power supply 112. Thus, in this preferred embodiment, the user 172 of the mobile device 102 becomes aware that the mobile device 102 is compromised when mobile device 102 is disabled.

In another embodiment, the server 150 is adapted to send a notice that the compromised mobile device is compromised to the compromised mobile device without first alerting analyst 170, for example, the server 150 sends the notice that mobile device 102 is compromised to mobile device 102. The notice is sent via the communication network 140 to the monitor application 124 executing on the processor 110 of the compromised mobile device 102. In response to the notice, the monitor application 124 adapts the processor 110 to alert a user 172 of the compromised mobile device 102 that the compromised mobile device 102 is compromised. Thus, in this embodiment, without delay the user 172 of the mobile device 102 becomes aware that the mobile device 102 is compromised, for example, with a notification on display 166 or the speakers of audio driver 168.

In yet another embodiment, the server 150 is adapted to both alert an analyst 170 and send a notice to the compromised mobile device 102. Thus, in this embodiment, the user 172 of compromised mobile device 102 is immediately warned that the mobile device 102 is compromised, and subsequently the compromised mobile device 102 is disabled after analyst 170 verifies that compromised mobile device 102 is compromised.

In one embodiment, mobile devices 104 and 106 are optional. Instead of server 150 generating a correlation among the logs 130 through 132 and 134 from mobile devices 102 through 104 and 106, the server 150 generates a correlation among a plurality of time segments of the logs 130 of the single mobile device 102. The monitor application 124 adapts the processor 110 of mobile device 102 to receive from the server 150, via the network interface 114 and via the communication network 140, the notice that the mobile device 102 is compromised in response to the correlator 152 identifying that at least one of the time segments of the logs 130 is an outlier 154 in the correlation for the mobile device 102. It will be appreciated that this can be done independently for each of mobile devices 102 through 104 and 106, and this can be also done in parallel with identifying that at least one of the mobile devices 102 through 104 and 106 is compromised because it is an outlier 154 of another correlation over the combined logs 130 through 132 and 134 from mobile devices 102 through 104 and 106.

In one embodiment, logged behavioral differences between benign and malicious applications are used to train machine learning algorithms to identify malicious behavior. During supervised training, certain machine learning algorithms are informed whether each application is benign or malicious to help the machine learning algorithm identify the differences between benign and malicious applications. Supervised machine learning algorithms include a decision tree, a support-vector machine, a nearest neighbor, and a naïve Bayes. Other machine learning algorithms receive unsupervised training because these algorithms identify the differences between benign and malicious applications without knowing beforehand whether each application is benign or malicious. Unsupervised machine learning algorithms include a k-means clustering, a hierarchical clustering, and an anomaly detection. The example implementation uses MATLAB for implementing the machine language algorithms because MATLAB has pre-built functions for performing these machine learning algorithms.

Known malicious applications were obtained from the Drebin (sec.cs.tu-bs.de in directory ~danarp/drebin) and Androzoo (androzoo.uni.lu) repositories. A control group of applications adds specific malice to certain classes of applications with desired traits. Malicious functionality was added to open-source applications from the F-Droid (f-droid.org) repository, for which source code is available, to produce a malicious version of each original benign application. Other benign applications were obtained from the Google Play Store.

The training in the example implementation evaluates the effectiveness of two distinct approaches to distinguish malicious and benign applications using various supervised and unsupervised machine learning algorithms.

Both approaches use multiple machine learning algorithms to assess the data collected from, for example, the three IOCs of power consumption, network activity, and sequence of system calls. The data is collected through a respective monitor application for each IOC and then sent to an off-device MongoDB server (mongodb.com). Because power drain and storage space from extensive data collection is a concern, the collected data is run through feature selection methods that reduce the number of individual features and retain the most relevant features. This increases the speed and efficiency of identifying malicious behavior of an application on a device. The feature reduction may differ between the two distinct approaches.

After completing training using the two distinct approaches, the most effective approach or approaches are retained along with their most effective machine learning algorithm or algorithms, and those less effective are eliminated. After training, the data collection applications deployed on the mobile devices and the machine learning algorithm deployed on the server are selected based on tradeoffs between various factors including accuracy, speed, amount of data collected, and resources utilized on the mobile devices. It will be appreciated that the most effective machine learning algorithm or algorithms may change when training using additional or different IOCs.

The first approach combines all three sets of IOC data into a single superset. The entire superset is assessed by multiple machine learning algorithms.

The second approach evaluates each of the IOCs separately, then subjects the results to further analysis. Evaluation of each IOC with multiple machine learning algorithms shows that different algorithms are most effective for different IOCs. The results from each machine learning algorithm for each IOC populate a new data set for further evaluation. One evaluation technique serializes machine learning algorithms, where the initial results of one algorithm are then analyzed through another algorithm. Another evaluation technique nests machine learning algorithms, where the collective results of the all IOCs' machine learning algorithms are used as inputs to another algorithm.

Each machine learning algorithm of each of the two distinct approaches is evaluated for accuracy based on its F-score for the supervised machine learning algorithms and its distance score for the unsupervised machine learning algorithms. In addition to accuracy, evaluation is based speed, amount of data collected, and resources utilized on the mobile devices.

For the supervised machine learning algorithms of a decision tree, a support-vector machine, a nearest neighbor, and a naïve Bayes, the F-score predicting whether an application is malicious is given by:

Precision=(number of correct positive predictions)/(total positive predictions)

Recall=(number of correct positive predictions)/(total actual positives)

$F$-score=2×Precision×Recall/(Precision+Recall).

For the unsupervised machine learning algorithms of a k-means clustering, a hierarchical clustering, and an anomaly detection, the distance score measuring the extent to which a given application is malicious is given by the application's distance outside a threshold radius around a center of each cluster.

In summary, various embodiments implement dynamic analysis using multiple IOCs that show a reduction in both false positives and false negatives as compared to static analysis or dynamic analysis using a single IOC.

Figure 2:
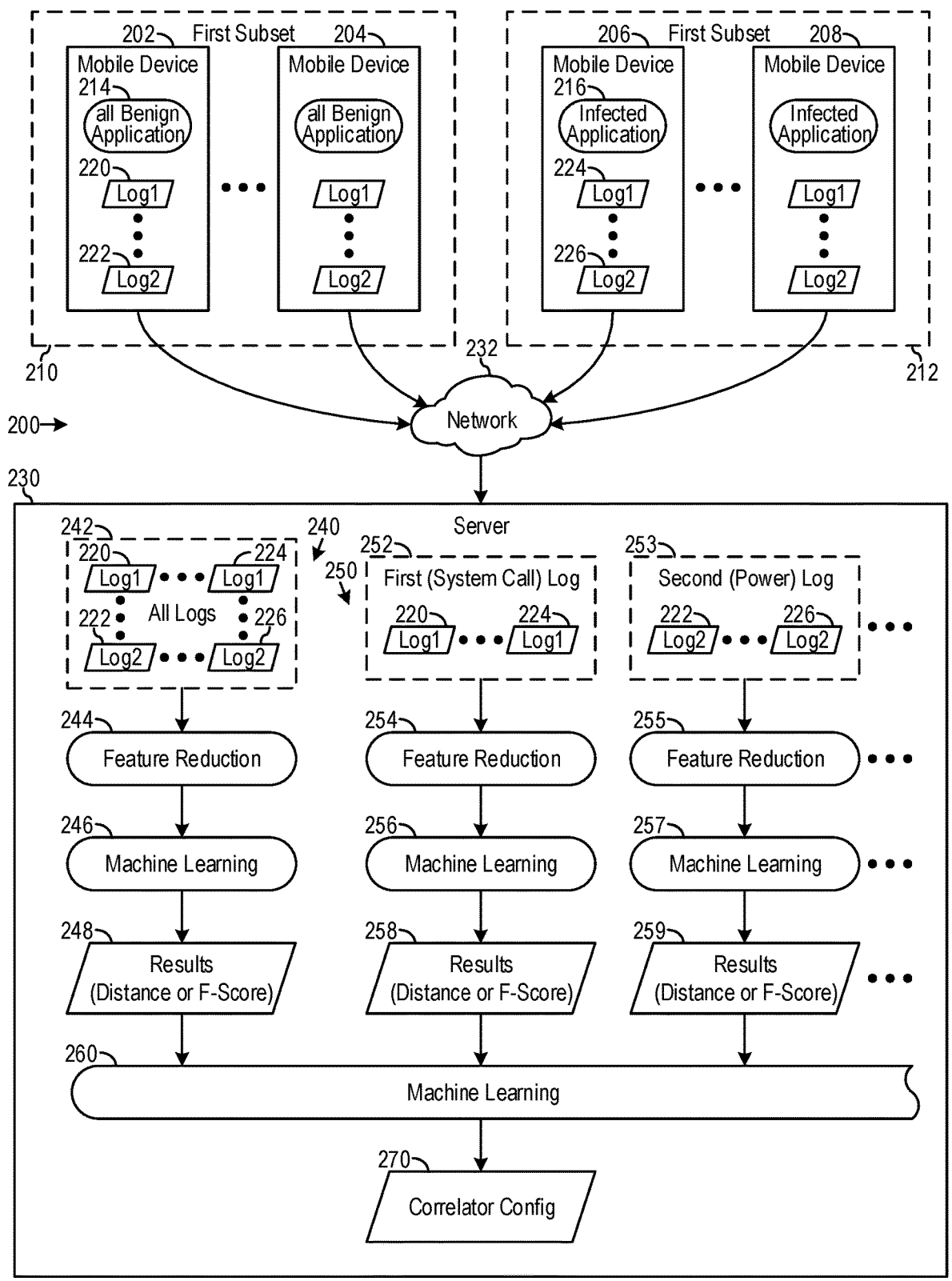
FIG. 2 is a block diagram of an embodiment of a system for training and identifying compromise of a mobile device.

FIG. 2 is a block diagram of an embodiment of a system 200 for training and identifying compromise of a mobile device.

During training, the mobile devices 202 through 204 and 206 through 208 include a first subset 210 of mobile devices 202 through 204 and second subset 212 of mobile devices 206 through 208. The first subset 210 of mobile devices 202 through 204 have applications that are known to be all benign applications 214. The second subset 212 of mobile devices 206 through 208 have the applications that are known to include at least one compromised application 216 infected with malicious instructions on each of the mobile devices 206 through 208.

The server 230 is trained to configure the correlation in response to differences between the logs 220 through 222 of the first subset 210 and the logs 224 through 226 of second subset 212 as received from mobile devices 202 through 204 and 206 through 208 via network 232.

In a first approach 240, the server 230 is adapted to generate the correlation from a first machine learning 246 over a feature reduction 244 of the all the logs 242, which include the logs 220 through 222 of the first subset 210 and the logs 224 through 226 of the second subset 212. During training, the first machine learning 246 includes various machine learning algorithms, such as the supervised machine learning algorithms including a decision tree, a support-vector machine, a nearest neighbor, or a naïve Bayes and the unsupervised machine learning algorithms including a k-means clustering, a hierarchical clustering, or an anomaly detection. First machine learning 246 generates results 248 including an F-score for each algorithm for supervised machine learning and a distance score for each algorithm for unsupervised machine learning.

In a second approach 250, the server 230 is adapted to generate the correlation from a variety of machine learning algorithms for a respective second machine learning 256 and 257 over each of a feature reduction 254 of the log 252 of the system calls, a feature reduction 255 of the log 253 of the indicated power consumed, and a similar machine learning over a feature reduction of the log of network activity and potentially other logs. The log 252 of the system calls includes the log 220 for the mobile devices 202 through 204 of the first subset 210 and the log 224 of the mobile devices 206 through 208 of the second subset 212. Similarly, the log 253 of the indicated power consumed includes the log 222 for the mobile devices 202 through 204 of the first subset 210 and the log 226 of the mobile devices 206 through 208 of the second subset 212. The respective second machine learning 256 and 257 generates results 258 and 259 including an F-score for each algorithm for supervised machine learning and a distance score for each algorithm for unsupervised machine learning.

For both approaches 240 and 250, the server 230 is further adapted to generate the correlation from a variety of machine learning algorithms for the third machine learning 260 over results 248 from the first machine learning 246 and results 258 and 259 of the respective second machine learning 256 and 257. The server 230 is trained to configure the correlation in response to differences between the logs 242, 252, and 253 as reflected in the results 248, 258, and 259 including the F-score for each algorithm of each supervised machine learning and the distance score for each algorithm of each unsupervised machine learning.

Training completes with the correlation configured to trim at least one less effective machine learning algorithm within the first machine 246 learning over all logs 242, the respective second machine learning 256 and 257 over each of the logs 252 and 253, and the third machine learning 260 over the results 248, 258, and 259.

In one example, the correlation might determine that one particular unsupervised algorithm in first machine learning 246 over all logs 242 combined with respective particular supervised algorithms in second machine learnings 256 and 257 over logs 252 and 253 produces results 248, 258, and 259 from which a particular supervised algorithm in the third machine learning 260 achieves high accuracy, while balancing tradeoffs between various factors including the accuracy, speed, amount of data collected, and resources utilized on the mobile devices. In this example, there might be no need for the respective second machine learning over the log of network activity in the second approach 250 because, for example, the third machine learning 260 determines there is an extremely high correlation between network activity and power consumption in the second approach 250, such that network activity provides no additional information except when included in all logs 242 for analysis with the first approach 240.

In another example, the correlation might determine that the first approach 240 is completely redundant and therefore trimmed as ineffective. Instead, accurate results are obtained using only the second approach 250 having one particular algorithm for the respective second machine learning 256 and 257 and a similar machine learning over the logs of network activity, and a particular algorithm for the third machine learning 260, with the other algorithms trimmed in the second approach 250.

The effective configuration of particular algorithms retained after trimming less effective algorithms from the machine learnings 246, 256, 257 and 260 are recorded in correlator configuration 270. After training, the system 200 has the same structure, except that the subsets 210 and 212 for mobile devices with benign and malicious applications are unknown beforehand, and instead the system 200 identifies whether there are any compromised mobile devices 206 through 208 in malicious subset 212 using in machine learning 246, 256, 257, and 260 those particular algorithms identified as effective in correlator configuration 270.

Figure 3:
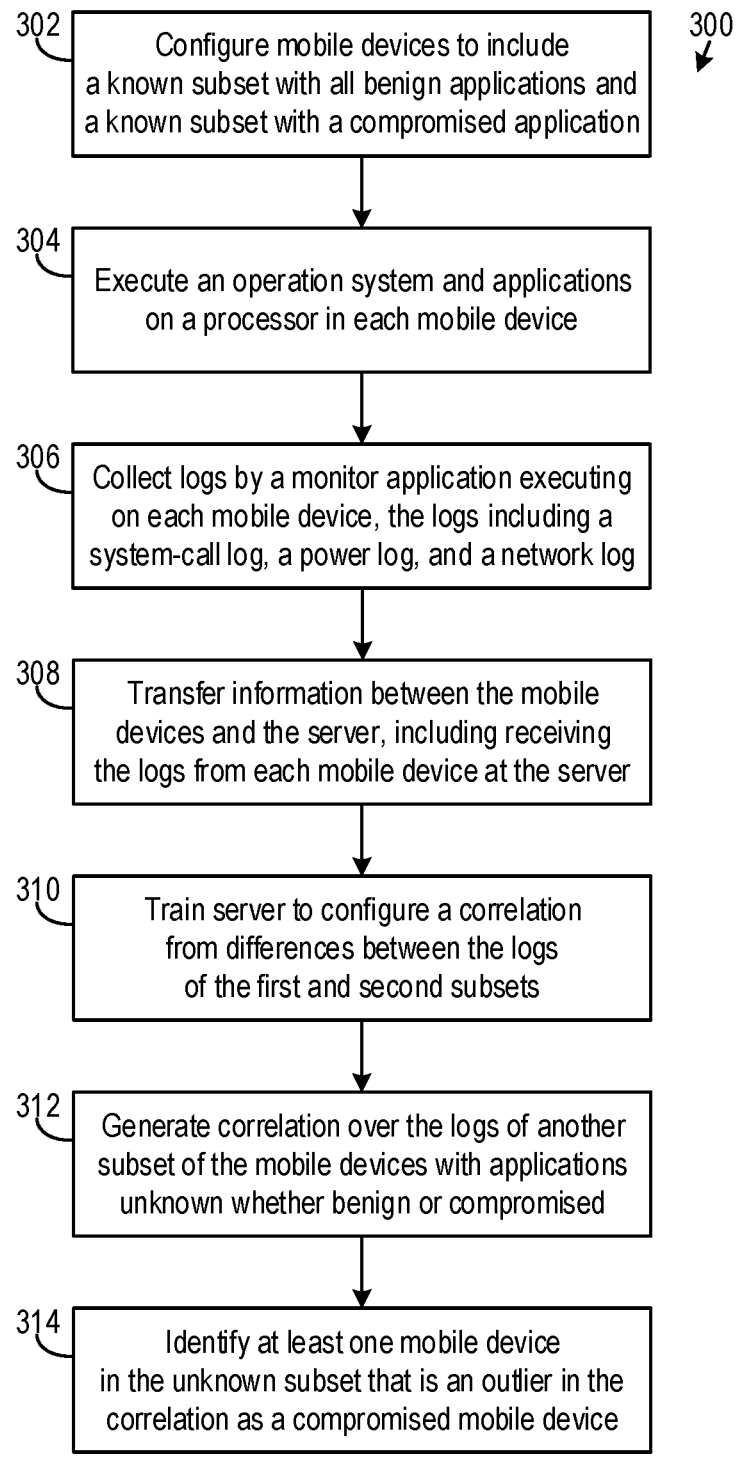
FIG. 3 is a flow diagram of an embodiment of a process for training and identifying compromise of a mobile device.

FIG. 3 is a flow diagram of an embodiment of a process 300 for training and identifying compromise of a mobile device.

Step 302 configures mobile devices into a first and second subset. The first subset has applications that are known to be all benign applications and the second subset has applications that are known to include at least one compromised application infected with malicious instructions.

Step 304 executes an operating system and applications by a processor of each mobile device. The operating system has an application interface providing system calls for the applications to invoke services of the operating system. The applications include at least one monitor application for monitoring a portion of the applications.

Step 306 securely collects logs by the monitor application executing on the processor of each mobile devices. Each mobile device includes the processor, a power supply, and a network interface. The logs include a log of the system calls invoked by each application, a log of the power provided by the power supply and consumed by the mobile device during executing each application, and a log of network activity through the network interface for each applications.

In one embodiment, generated pseudo-random activity is arranged to appear to originate from a respective user of each mobile devices. The logs include the system calls invoked in response to the pseudo-random activity, the power consumed in response to the pseudo-random activity, and the network activity generated in response to the pseudo-random activity.

Step 308 transfers information to and from the network interface of each mobile device via a communications network. This includes receiving at a server the logs from each mobile device via the communication network.

Step 310 trains a server to configure a correlation in response to differences in the logs between the first subset and the second subset. This includes evaluating the effectiveness of a variety of machine learning algorithms for identifying whether a mobile device is compromised, and configuring the correlation to use the more effective machine learning algorithms.

Step 312 generates, by the server, a correlation among the logs of the mobile devices. Generally, the correlation analyzes the logs for two or more different IOCs.

Step 314 identifies, by the server, at least one of the mobile devices that is an outlier in the correlation as a compromised mobile device.

From the above description of the System and Method for Aggregated Machine Learning on Indicators of Compromise on Android Devices, it is manifest that various techniques may be used for implementing the concepts of system 100 and process 300 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that system 100 and process 300 are not limited to the particular embodiments described herein, but they are capable of many embodiments without departing from the scope of the claims.

We claim:

1. A system for identifying compromise of a compromised mobile device comprising:
   a plurality of mobile devices, each mobile device of the mobile devices including a processor, a power supply, and a network interface, wherein:
      the processor is adapted to execute an operating system and a plurality of applications, the operating system having an application interface providing a plurality of system calls for the applications to invoke a plurality of services of the operating system, the applications including at least one monitor application for monitoring a portion of the applications,
      the power supply providing power consumed by the mobile device during execution of the operating system and the applications, the power supply indicating the power consumed, and
      the network interface for transferring information to and from the mobile device, the information including a plurality of logs securely collected by the at least one monitor application executing on the processor, the logs including at least one selected from: a log of the system calls invoked by each of the portion of the applications, a log of the indicated power consumed by the mobile device during executing each of the portion of the applications, or a log of network activity through the network interface for each of the portion of the applications;
   a communication network for transferring the information to and from the network interface of each of the mobile devices; and
   a server for receiving the logs within the information from each of the mobile devices via the communication network, pluralities of the logs including the plurality of logs from each of the mobile devices, the server adapted to generate a correlation among the pluralities of the logs of the mobile devices, and adapted to identify at least one of the mobile devices that is an outlier in the correlation as the compromised mobile device.

2. The system of claim 1, wherein the outlier in the correlation further identifies at least one of the applications of the compromised mobile device as a compromised application on the compromised mobile device.

3. The system of claim 1, wherein the logs include all of the log of the system calls, the log of the indicated power consumed, and the log of network activity.

4. The system of claim 3, wherein the logs of each mobile device of the mobile devices further include a log of position from a global positioning receiver included in the mobile device, a log of movement from an accelerometer included in the mobile device, and a log of illumination from a light sensor included in the mobile device.

5. The system of claim 3, wherein the server is adapted to generate the correlation from a first machine learning over a feature reduction of the logs and/or a respective second machine learning over each of a feature reduction of the log of the system calls, a feature reduction of the log of the indicated power consumed, and a feature reduction of the log of network activity, and the server is further adapted to generate the correlation from a third machine learning over results from the first machine learning and/or results of each of the respective second machine learning.

6. The system of claim 5, wherein each machine learning of the first machine learning over the logs, the respective second machine learning over each of the logs, and the third machine learning is a respective one or both of a supervised machine learning generating an F-score and an unsupervised machine learning generating a distance score, and the supervised machine learning for each is one or more of a decision tree, a support-vector machine, a nearest neighbor, or a naïve Bayes and the unsupervised machine learning for each is one or more of a k-means clustering, a hierarchical clustering, or an anomaly detection.

7. The system of claim 6, wherein:
   the mobile devices include a first and second subset of the mobile devices, the first subset of the mobile devices having the applications that are known to be all benign applications, and the second subset of the mobile devices having the applications that are known to include at least one compromised application infected with malicious instructions, and
   the server is trained to configure the correlation in response to differences in the pluralities of the logs between the first subset and the second subset as reflected in the F-score of each supervised machine learning and the distance score of each unsupervised machine learning, the correlation configured to trim at least one less effective machine learning within the first machine learning over the logs, the respective second machine learning over each of the logs, and the third machine learning.

8. The system of claim 1, wherein:
   the mobile devices include a first and second subset of the mobile devices, the first subset of the mobile devices having the applications that are known to be all benign applications, and the second subset of the mobile devices having the applications that are known to include at least one compromised application infected with malicious instructions, and
   the server is trained to configure the correlation in response to differences in the pluralities of the logs between the first subset and the second subset.

9. The system of claim 1, wherein the log of the system calls invoked by each application of the portion of the applications include a log of a system call invoked by the application to request permission to use restricted ones of the services of the operating system.

10. The system of claim 1, wherein the log of the indicated power consumed by the mobile device during executing each of the portion of the applications includes the indicated power consumed by each of the processor, a wireless ethernet interface of the network interface, a cellular interface of the network interface, a display, an audio driver, and a global positioning receiver during executing each of the portion of the applications.

11. The system of claim 1, wherein, for each application of the portion of the applications, the log of network activity through the network interface includes, for each of a wireless ethernet interface and a cellular interface of the network interface, a quantity of data transferred by the application, the frequency of network activity by the application, and an indicator that the application is executing in a foreground or a background.

12. The system of claim 1, wherein the server is adapted to alert an analyst that the compromised mobile device is compromised, and in response to the analyst verifying that the compromised mobile device is compromised, the server is adapted to send a notice via the communication network to the at least one monitor application executing on the processor of the compromised mobile device, and in response to the notice the at least one monitor application adapts the processor to disable the compromised mobile device.

13. The system of claim 1, wherein the server is adapted to send a notice that the compromised mobile device is compromised to the compromised mobile device, the notice sent via the communication network to the at least one monitor application executing on the processor of the compromised mobile device, and in response to the notice the at least one monitor application adapts the processor to alert a user of the compromised mobile device that the compromised mobile device is compromised.

14. A mobile device comprising:
a processor adapted to execute an operating system and a plurality of applications, the operating system having an application interface providing a plurality of system calls for the applications to invoke a plurality of services of the operating system, the applications including at least one monitor application for monitoring a portion of the applications;
a power supply providing power consumed by the mobile device during execution of the operating system and the applications, the power supply indicating the power consumed; and
a network interface for transferring information via a communications network, including sending to a server a plurality of logs securely collected by the at least one monitor application executing on the processor, the logs including at least one selected from: a log of the system calls invoked by each of the portion of the applications, a log of the indicated power consumed by the mobile device during executing each of the portion of the applications, or a log of network activity through the network interface for each of the portion of the applications,
wherein the at least one monitor application adapts the processor to receive from the server, via the network interface and via the communication network, a notice that the mobile device is compromised in response to the server generating a correlation from the logs of the mobile device and in response to the server identifying that the mobile device is an outlier in the correlation.

15. The mobile device of claim 14, wherein the at least one monitor application adapts the processor to receive from the server, via the network interface and via the communication network, the notice that the mobile device is compromised in response to the server generating the correlation among a plurality of time segments of the logs of the mobile device and in response to the server identifying that at least one of the time segments is an outlier in the correlation for the mobile device.

16. The mobile device of claim 14, wherein the at least one monitor application adapts the processor to receive from the server, via the network interface and via the communication network, the notice that the mobile device is compromised in response to the server generating the correlation among the logs of the mobile device and pluralities of similar logs of a plurality of similar mobile devices and in response to the server identifying that the mobile device is an outlier in the correlation.

17. The mobile device of claim 14, wherein the at least one monitor application adapts the processor to receive from the server the notice that the mobile device is compromised in response to the server further alerting an analyst that the mobile device is compromised and the analyst verifying that the mobile device is compromised, and the at least one monitor application adapts the processor to disable the mobile device in response to the notice received from the server.

18. A method for identifying compromise of at least one mobile device comprising:
executing an operating system and a plurality of applications by a respective processor of each of a plurality of mobile devices, each of the mobile devices including the respective processor, a respective power supply, and a respective network interface, the operating system having an application interface providing a plurality of system calls for the applications to invoke a plurality of services of the operating system, the applications including at least one monitor application for monitoring a portion of the applications;
securely collecting a plurality of logs by the at least one monitor application executing on the respective processor of each mobile device of the mobile devices, the logs including at least one selected from: a log of the system calls invoked by each of the portion of the applications, a log of the power provided by the respective power supply and consumed by the mobile device during executing each of the portion of the applications, or a log of network activity through the respective network interface for each of the portion of the applications;
transferring information to and from the respective network interface of each of the mobile devices via a communications network, including receiving at a server the logs from each of the mobile devices via the communication network, wherein pluralities of the logs include the plurality of logs from each of the mobile devices;
generating, by the server, a correlation among the pluralities of the logs of the mobile devices; and
identifying, by the server, at least one of the mobile devices that is an outlier in the correlation as a compromised mobile device.

19. The method of claim 17, further comprising:
configuring the mobile devices to include a first and second subset of the mobile devices, the first subset of the mobile devices having the applications that are known to be all benign applications, and the second subset of the mobile devices having the applications that are known to include at least one compromised application infected with malicious instructions; and
training the server to configure the correlation in response to differences in the pluralities of the logs between the first subset and the second subset.

20. The method of claim 18, wherein:
the configuring the mobile devices to include the first and second subset includes generating pseudo-random activity arranged to appear to originate from a respective user of each of the mobile devices, and
the securely collecting the logs includes securely collecting the log of the system calls invoked in response to the pseudo-random activity from each of the mobile devices, securely collecting the log of the power consumed by the mobile device in response to the pseudo-random activity from each of the mobile devices, and securely collecting the log of the network activity generated in response to the pseudo-random activity from each of the mobile devices.

* * * * *